United States Patent [19]

Thomson

[11] 4,106,613

[45] Aug. 15, 1978

[54] CONVEYOR BELTS

[76] Inventor: Ian Main Thomson, "Silverstock", Sandhurst Rd., Wokingham, Berkshire, England

[21] Appl. No.: 774,490

[22] Filed: Mar. 4, 1977

Related U.S. Application Data

[63] Continuation-in-part of Ser. No. 575,782, May 8, 1975, abandoned, which is a continuation-in-part of Ser. No. 381,567, Jul. 23, 1973, abandoned.

[30] Foreign Application Priority Data

Aug. 11, 1972 [GB] United Kingdom ............... 37679/72

[51] Int. Cl.² .............................................. B65G 15/34
[52] U.S. Cl. .................................... 198/847; 139/415; 428/259
[58] Field of Search ............. 74/231 R, 233; 139/408, 139/409, 413, 415; 428/257, 258, 272, 259; 198/833, 847

[56] References Cited

U.S. PATENT DOCUMENTS

| Re. 26,731 | 12/1969 | Robinson | 198/847 |
|---|---|---|---|
| 3,051,212 | 8/1962 | Daniels | 74/233 |
| 3,205,119 | 9/1965 | Paul | 198/847 |
| 3,343,652 | 9/1967 | Thomson | 198/847 |
| 3,498,684 | 3/1970 | Hallaman | 198/847 |

FOREIGN PATENT DOCUMENTS 1,184,303  3/1970  United Kingdom ..................... 198/847

Primary Examiner—Evon C. Blunk
Assistant Examiner—Jeffrey V. Nase
Attorney, Agent, or Firm—Brady, O'Boyle & Gates

[57] ABSTRACT

A conveyor belt is disclosed of the type adapted to be supported and driven by a pair of wire ropes at or adjacent its edges. The belt comprises a body of rubber reinforced by at least two sheets of fabric embedded therein. Each sheet of fabric includes transverse filaments arranged in two planes and intimately bonded to the rubber. The transverse filaments are of specified size and elasticity. The combination of these physical characteristics of the filaments and their location in the rubber body result in the transverse filaments and the rubber acting together in the manner of an I-beam in resisting transverse loads, both compressive and tensile forces produced by transverse bending being carried principally by the filaments while shear forces are principally taken by the rubber.

8 Claims, 4 Drawing Figures

CONVEYOR BELTS

REFERENCE TO RELATED APPLICATIONS

This application is a continuation-in-part of my earlier application Ser. No. 575,782 filed May 8, 1975 which in turn was a continuation-in-part of my earlier application Ser. No. 381,567 filed July 23, 1973, both now abandoned.

BACKGROUND OF THE INVENTION

This invention is concerned with conveyor belts of the type supported and driven by two rope circuits, each engaging the belt on the underside thereof at or adjacent a respective edge thereof.

Conveyor belts of this type must have considerable lateral stiffness to support the load carried, since the belt is supported only at its edges. However, in the longitudinal direction the belt must be flexible to permit it to be trained around guide drums. In a typical rope-driven conveyor for use in the mining industry, the span of the belt between the ropes is 36 to 41 inches and the carrying capacity requires a transverse stiffness which will satisfactorily deal with an E/I ratio (ratio of stress to moment of area) of about 2500 lb.in$^2$. At the same time, in the longitudinal direction the belt must be sufficiently flexible to pass around end drums 12 inches in diameter, that is the belt must be capable of bending to a 6 inch radius.

In conveyor belts of this type hitherto used, the required transverse stiffness has been provided by moulding into the belt, which itself is made from flexible elastomeric or plastics material (hereinafter, for convenience, all referred to as "rubber," which is the preferred material for use in the present invention) laterally extending reinforcing members. Typically there has been used for this purpose spring steel strips each 0.2 inch in the direction of thickness of the belt and 0.5 inch longitudinally of the belt, the strips extending substantially across the whole width of the belt and being spaced at intervals of 3 inches along the belt.

Such a construction is expensive in both materials and fabrication costs.

SUMMARY OF THE INVENTION

The principal object of the present invention is to provide a conveyor belt of the above type with improved means for imparting the necessary lateral stiffness while permitting of the necessary longitudinal flexibility.

For this purpose the invention provides a conveyor belt comprising a body of rubber provided with formations adjacent its edges adapted to be engaged by respective ropes to support and drive the belt. At least two sheets of open construction fabric are embedded in said body, said sheets being co-extensive longitudinally of the body and at least partly co-extensive laterally of the body and being spaced apart from each other in the direction of the thickness of said body. Each of said sheets includes a plurality of laterally extending flexible tensile and compressive force resisting filaments and plural longitudinally extending spacing strands, said filaments being disposed substantially parallel to each other along the body and extending for at least part of their length in a substantially straight line and being bonded to the rubber in proximity to the outer faces of the belt. Said filaments have a modulus of elasticity exceeding 100,000 pounds per square inch and a diameter in the range of 0.001 to 0.100 inch, and said body of rubber penetrates into and through said open construction fabric and mechanically interlocks with said filaments, whereby both compressive and tensile forces produced by the transverse bending of the belt are resisted by the filaments while shear forces are absorbed by the rubber.

It has surprisingly been found that the filaments produce a belt which is unexpectedly stiff laterally and yet can if desired be very flexible longitudinally, and that the degree of lateral stiffness can be readily predetermined and varied.

This effect is caused, it is believed, by the fact that filaments of the characteristics specified combine with the rubber to act in the transverse direction under load as a composite beam, that is in a manner similar to an I-beam supported at its ends and loaded intermediate its ends, with both tensile and compressive forces being carried by the filaments. In contrast, in prior materials known to me the transverse filaments are capable of carrying load in tension only.

German Gebrauchsmuster No. 7123311 describes a conveyor belt which is superficially similar to that of the present invention, but contains no suggestion of a composite beam structure nor any reference to the necessity that the weft yarn (corresponding to the filaments of the present invention) should be bonded or locked to the rubber, which is necessary for the production of a composite beam structure. In the present invention, such bonding or locking is necessary so that no slipping can take place between the filaments and the rubber and so that shear can be transmitted from the filaments to the rubber and vice versa. In the Gebrauchsmuster, it is stated that the warp yarns form a composite with the weft yarns and it is stated that this is of vital importance in enabling the weft yarns to resist buckling. In the present invention, resistance to buckling of the weft yarns is provided by two factors: (a) the yarn filaments are of a selected size and elasticity, and (b) the close and intimate bonding between the rubber and the weft yarns. The applicant has carried out tests which show that in his invention the spacing of the warp yarns is of little significance and that in the present invention the warp yarns are essentially only to hold the fabric together during processing.

U.S. Pat. No. 3,205,119 describes a conveyor belt reinforced by a fabric in which the weft yarns are coated with substances which allow good adhesion and non-flammability with the rubber. In fact the weft yarns are wrapped with synthetic fibres of another material to give the adhesion. The patent mentions that the material of the weft yarns is chosen as a function of the mechanical characteristics which it is desired to impart to the belt in the transverse direction, but nowhere does it state how this property of transverse stiffness is to be achieved. The patent does not refer to a composite structure in which the rubber is used for the properties of shear resistance and the fabric provides tensile and compressive resistance.

Additionally, the above prior documents do not specify the type of conveyor belt with which they are concerned, and they do not suggest the attainment of the degree of stiffness which is necessary with rope driven conveyors.

BRIEF DESCRIPTION OF THE DRAWINGS

The following is a description, by way of example, of embodiments of the invention, reference being made to the accompanying drawings, in which.

DESCRIPTION OF PREFERRED EMBODIMENTS

Figure 1:
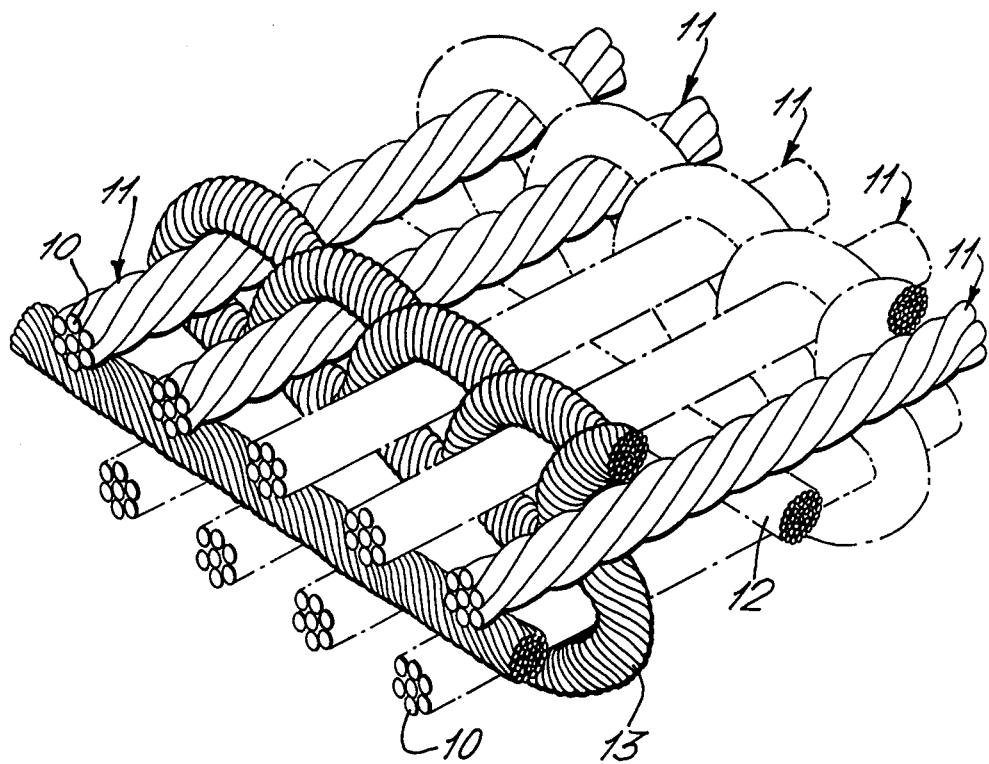
FIG. 1 is an isometric view of a piece of woven fabric containing flexible plastics filaments.

Referring to FIG. 1, the woven fabric contains continuous filaments 10 of polyethylene terephthalate. The filaments 10 are of substantially circular cross-section with a diameter of 0.010 inch and a modulus of elasticity of about 500,000 lbs/sq.in. Their breaking stress is between 50,000 and 100,000 lbs./sq.in. and their extension at break is between 5% and 20%.

The filaments 10 are spun into yarns 11, the spinning being effected with as little twist of the filaments as possible to keep the modulus of elasticity of the yarns as close as possible to that of the filaments. Each yarn 11 consists of seven filaments 10. However, other numbers of filaments per yarn may be employed, depending on the spinning machine. The fabric contains two rows of yarns. Each row has 22 yarns per inch (i.e., there are a total of 44 yarns per inch of fabric). The yarns are woven with and so as to be held in position by spacing strands 12 between the two rows, and by lacing strands 13 passing through the rows and around the yarns. The weave is such that the yarns 10 are as straight as possible without interweaving and with little or no crimping, so that the modulus of elasticity of the yarns is as close as possible to that of the filaments. The strands 12 and 13 are only necessary to hold the yarns 10 in position firmly during subsequent processing and, since these strands need have no particular mechanical characteristics for the efficiency of the finished belt, they may be of any convenient and cheap material such as cotton or polyamide, and may be spun from thin yarn with a high degree of twist. The weave of the fabric shown in FIG. 1 is sufficiently open that rubber can readily penetrate the fabric so that they become bonded together.

Figure 2:
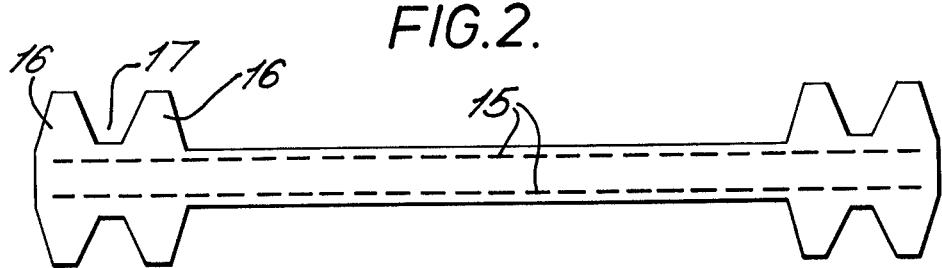
FIGS. 2, 3 and 4 are cross-sectional views showing three different constructions of conveyor belt in accordance with the invention having embedded therein the fabric of FIG. 1.

FIG. 2 shows a cross-section through a conveyor belt comprising a body 14 of rubber formed adjacent its edges with pairs of projecting ribs 16 defining grooves 17 for receiving respective ropes by which the belt is supported and driven. Embedded in the body 14 are two sheets 15 of woven fabric, each sheet 15 being as described above with reference to FIG. 1, with the yarns 11 extending laterally of the belt (i.e. from left to right in FIG. 2). The sheets 15 are parallel to the flat outer faces of the belt. They extend along the whole length of the belt and over substantially its whole width.

In producing the belt, the fabric is treated with a known bonding agent to facilitate bonding of rubber to the fabric. A thin layer of rubber is deposited on the fabric by spread coating or calendering. This rubber is of a soft tacky constituency and penetrates round the yarns and strands and provides a sticky surface. A sheet of rubber which will constitute the external belt cover is calendered or laid on to this layer. A suitable length of the resulting assembly is then placed with the cover face down on a table. A further sheet of rubber is placed on it to form a separating layer between the two sheets 15 and as indicated in FIG. 2 this sheet of rubber is of substantial thickness since the majority of the thickness of the belt is in the separating layer between the two sheets 15. On top of this further sheet is placed another length of the aforesaid assembly but with the cover facing upwards. As all of the components are tacky, they stick together and adherence is improved by the application of pressure by a press or rollers. The best results are obtained if, at this stage, the fabric is not stretched by more than 3% in the direction of the length of the yarns 11. The resulting belt is placed in a press and subjected to the correct conditions of heat and pressure to allow the whole belt to vulcanize firmly together. Increased stiffness can be obtained by holding the fabric near its longitudinal edges so that during vulcanization the fabric cannot shrink laterally.

Figure 3:
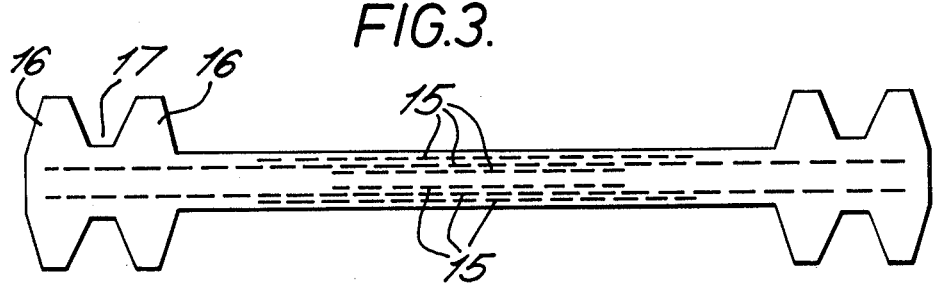

The transverse rigidity of the belt can be readily varied across its width in various ways. For example, additional sheets 15 of fabric of suitable widths may be embedded at different points as shown in FIG. 3, where the central portion of the belt will be substantially stiffer than the marginal portions with transitional portions of intermediate stiffness between.

Figure 4:
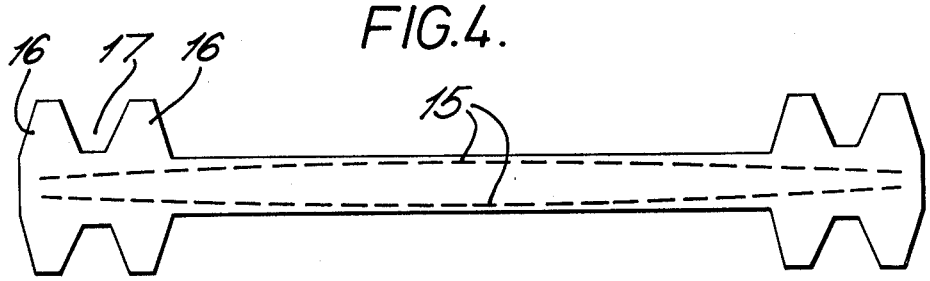

Alternatively, the distance between the sheets 15 may decrease from the centre towards the edges of the belt as shown in FIG. 4, so that the stiffness of the belt gradually decreases towards the edges, this being equivalent to reducing the length of web between the flanges of an I-beam. Another method is to increase the rigidity of the rubber material between the sheets 15 at various positions. In another method, the effective modulus of elasticity of the fabric sheets is varied over the width of the belt by crimping the fabric at selected positions.

With varying rigidity across the belt, the belt may be formed to "hinge" about longitudinal lines to allow greater quantities of material to be carried on the belt.

Although in the above description a woven fabric is used, it will be understood that alternatively a non-woven fabric may be used, having the same type and disposition of transverse filaments, for example stitched or adhered to a backing sheet.

To obtain the composite beam action of the invention, it is necessary not only to provide an intimate bond between the fabric and the rubber, but also to use transverse filaments having a size and elasticity selected from the very wide range of fibres obtainable. The modulus of elasticity should be greater than $10^4$ lbs/sq.in. and preferably greater than $10^5$ lbs/sq.in. A value of about 400,000 to 500,000 lbs/sq.in. is particularly suitable. The preferred size depends on the modulus of elasticity, a lower modulus of elasticity requiring a larger filament diameter to give the same results as a higher modulus of elasticity with a smaller filament diameter. The filament diameter should be greater than 0.001 inch. With a modulus of elasticity of about 500,000 lbs/sq.in., a filament diameter of 0.01 inch is suitable. The modulus and/or diameter should not be so great as to make it difficult to form the filaments into a fabric, preferably on standard weaving or other fabric-making machines. Also, the increased quantity and cost of filament material resulting from increased filament diameter beyond a certain value may be found not to be justified by increased belt stiffness. The filament diameter should not be greater than 0.100 inch.

The filaments may be circular or non-circular in cross-section. For the purposes of this specification, a filament of non-circular cross-section is considered to have a diameter equivalent to that of a filament of circular cross-section having a moment of inertia equal to the minimum moment of inertia of the non-circular filament.

Other important properties of the filaments are breaking stress and extension at break. A sufficiently high breaking stress, e.g., 50,000 to 100,000 lbs/sq.in., and a sufficiently high extension at break, e.g., 5 to 20%, are necessary for good results.

The preferred filament material is polyethylene terephthalate, but nylon and other plastics may be used although larger filament diameters may be necessary than with polyethylene terephthalate.

Comparative Tests

For comparison purposes tests were made on three slabs with characteristics as follows. The test carried out was to place each slab under a longitudinal compressive load and a bending moment.

Slabs

Each slab was 10 inches square by 0.75 inch thick, formed of EPDM rubber compound with a hardness of 70° Shore A.

Reinforcement

Slab A — None

Slab B — Two layers of textile fabric spaced 0.195 inch apart. The fabric was a woven textile fabric as conventionally used in reinforcing rubber. A number of slabs of this type with different reinforcing materials was tested.

Slab C — Two layers of fabric as described with reference to FIG. 1, spaced 0.195 inch apart.

Test Results

Slab A — resistance 25 inch/pound
Slab B — resistance 50 to 100 inch/pound
Slab C — resistance 500 inch/pound The above results make clear the surprising increase in resistance given by the present invention.

It would of course be possible to use a harder, i.e., stiffer, rubber for Slabs A and B to give them the same stiffness as Slab C. However, such material would be of no use in practice because the belt would not be able to bend round the drums at the ends of the conveyor. The belt of the present invention, on the other hand, has substantial lateral rigidity accompanied by longitudinal flexibility.

I claim:

1. A conveyor belt adapted to be supported and driven by ropes adjacent its edges, the belt comprising a body of rubber provided with formations adjacent its edges extending above and below the belt and adapted to be engaged by respective ropes to support and drive the belt, at least two sheets of open construction woven synthetic fabric embedded in said body, said sheets being coextensive longitudinally of the body and coextensive laterally of the body and coextensive with said formations adjacent the edges and being spaced apart from each other in the direction of the thickness of the body by a major portion of the thickness of the body of rubber, each of said sheets including two layers of a plurality of laterally extending flexible tensile and compressive force resisting yarns and plural longitudinally extending spacing strands positioned between and separating the two layers and spaced from each other a greater distance than said yarns, said yarns being disposed substantially parallel to each other along the body and extending for at least part of their length in a substantially straight line, said yarns each consisting of a plurality of synthetic filaments of polyethylene terephthalate spun or twisted together and being bonded directly to the rubber in proximity to the outer faces of the belt, said filaments having a modulus of elasticity exceeding 100,000 pounds per square inch and being of large diameter in the range of 0.001 to 0.100 inch, and said body of rubber penetrating into and through said two sheets of open construction fabric to mechanically interlock with said yarns, whereby both tensile and compressive forces produced by the transverse bending of the belt are resisted by the filaments while shear forces are absorbed by the rubber.

2. A conveyor belt according to claim 1, in which the rigidity of the rubber is varied across the width of the body, thereby varying the stiffness across the width of the body.

3. A conveyor belt according to claim 1, each sheet including lacing strands passing through the two layers and around the yarns in the said two layers in non-crimping relation.

4. A conveyor belt according to claim 1, in which the modulus of elasticity of the filaments is about 500,000 lbs/sq.in., the diameter of the filaments is about 0.01 inch, and the filaments have a breaking stress between 50,000 and 100,000 lbs/sq.in. and an extension at break between 5 and 20%.

5. A conveyor belt adapted to be supported and driven by ropes adjacent its edges, the belt comprising a body of rubber provided with formations adjacent its edges adapted to be engaged by respective ropes to support and drive the belt, two sheets of open construction woven synthetic fabric embedded in said body, said sheets being coextensive longitudinally and laterally of the body and coextensive with said formations adjacent the edges and being spaced apart from each other in the direction of the thickness of the body by a major portion of the thickness of the body of rubber, an additional sheet of open construction woven synthetic fabric for each of said two sheets embedded in said body closely adjacent thereto and coextensive longitudinally therewith and of lesser width than said two sheets thereby varying the stiffness across the width of the body, each of said sheets including a plurality of laterally extending flexible tensile and compressive force resisting yarns and plural longitudinally extending spacing strands positioned between and separating the two layers, said yarns being disposed substantially parallel to each other along the body and extending for at least part of their length in a substantially straight line, said yarns each consisting of a plurality of synthetic filaments spun or twisted together and being bonded directly to the rubber in proximity to the outer faces of the belt, said filaments having a modulus of elasticity exceeding 100,000 pounds per square inch and a diameter in the range of 0.001 to 0.100 inch, and said body of rubber penetrating into and through said two sheets and additional sheets of open construction fabric to mechanically interlock with said yarns, whereby both tensile and compressive forces produced by the transverse bending of the belt are resisted by the filaments while shear forces are absorbed by the rubber.

6. A conveyor belt as set forth in claim 5, including a pair of additional sheets of open construction woven fabric positioned on opposite sides of and closely adjacent to a respective one of each of said two sheets, said pair of additional sheets being of different widths from each other and from said respective one of said two sheets.

7. A conveyor belt adapted to be supported and driven by ropes adjacent its edges, the belt comprising a body of rubber provided with formations adjacent its edges adapted to be engaged by respective ropes to support and drive the belt, at least two sheets of open construction woven synthetic fabric embedded in said body, said sheets being coextensive longitudinally and laterally of the body and coextensive with said formations adjacent the edges and being spaced apart from each other in the direction of the thickness of the body, each of said sheets including a plurality of laterally extending flexible tensile and compressive force resisting yarns and plural longitudinally extending spacing strands positioned between and separating the two layers, said yarns being disposed substantially parallel to each other along the body and extending substantially straight, said yarns each consisting of a plurality of synthetic filaments spun or twisted together and being bonded directly to the rubber in proximity to the outer faces of the belt, said filaments having a modulus of elasticity exceeding 100,000 pounds per square inch and a diameter in the range of 0.001 to 0.100 inch, and said body of rubber penetrating into and through said two sheets of open construction fabric to mechanically interlock with said yarns, at least one of said two sheets embedded in said body at a depth from one outer face of the belt which varies across the width of the body thereby varying the stiffness across the width of the body, whereby both tensile and compressive forces produced by the transverse bending of the belt are resisted by the filaments while shear forces are absorbed by the rubber.

8. A conveyor belt as set forth in claim 7 in which both of said two sheets are embedded in said body at varying depths across the width of the body from the outer faces of the belt, said two sheets being in proximity to the outer faces of the belt at the medial portion of the belt and the distance between the two sheets decreasing from the medial portion of the belt toward the edges of the belt.

* * * * *